March 23, 1965 A. W. SERIO 3,174,424
BEVERAGE BREWING APPARATUS
Filed March 31, 1961 9 Sheets-Sheet 1
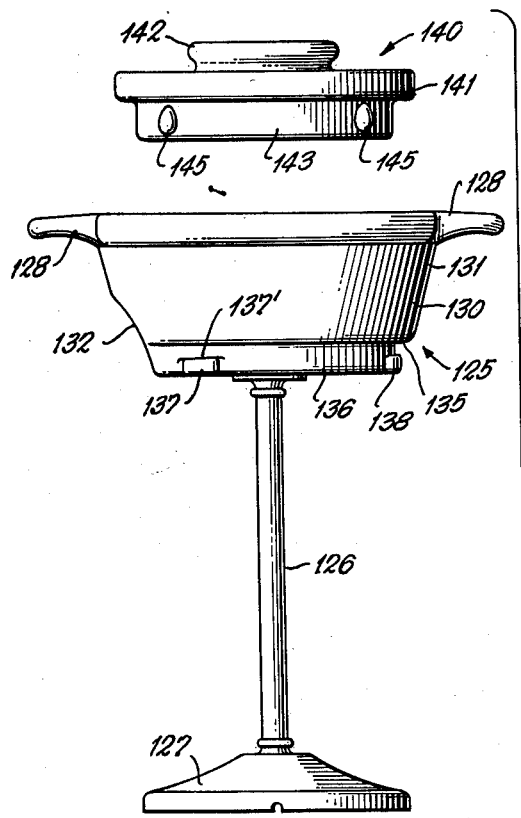
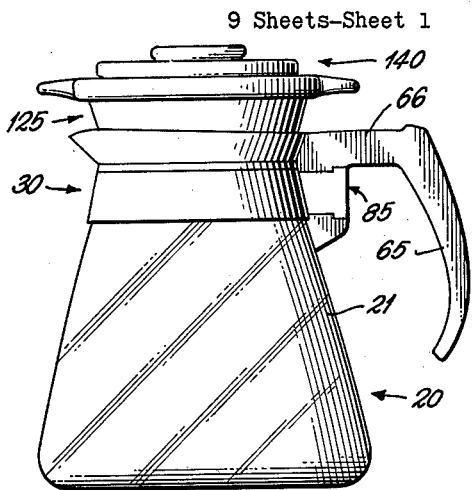
Fig. 1.
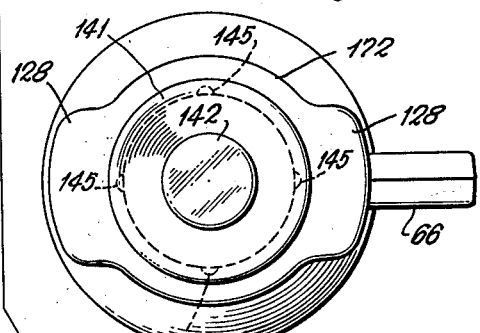
Fig. 2.
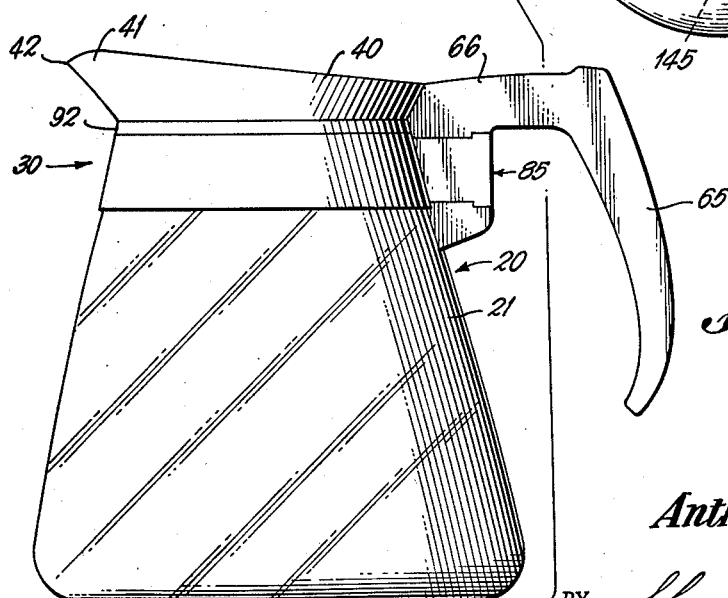
Fig. 3.
INVENTOR
Anthony W. Serio
BY Shoemaker and Mattare
ATTORNEYS March 23, 1965  A. W. SERIO  3,174,424
BEVERAGE BREWING APPARATUS
Filed March 31, 1961  9 Sheets-Sheet 2

INVENTOR
Anthony W. Serio
BY
ATTORNEYS

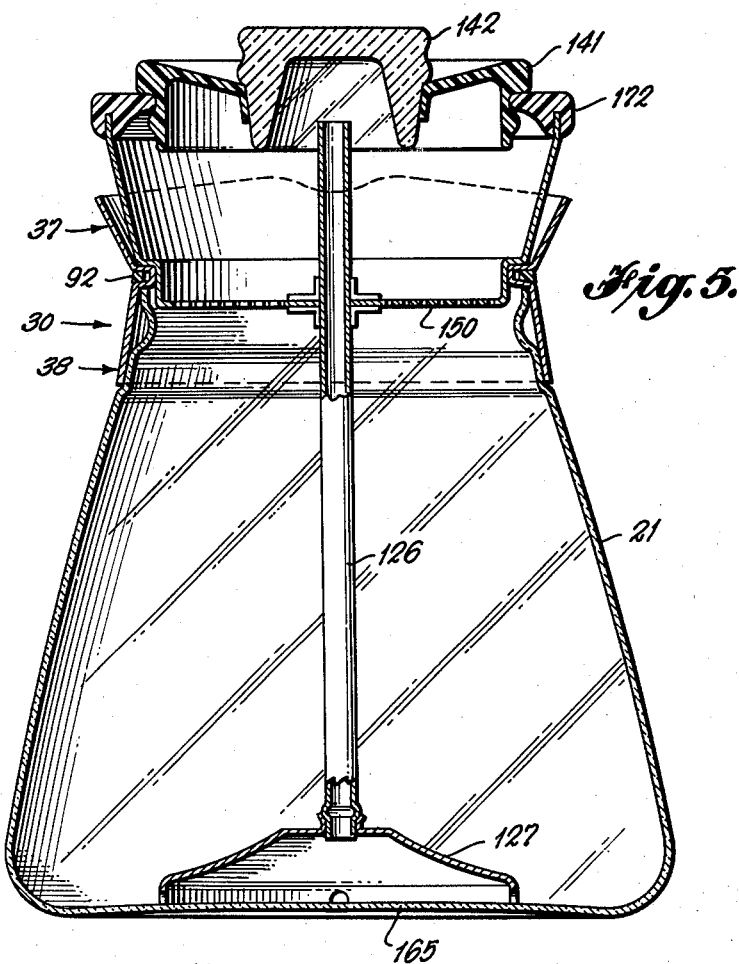
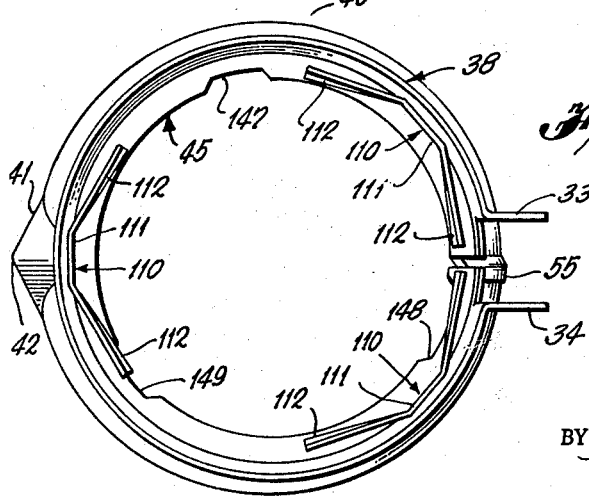

March 23, 1965  A. W. SERIO  3,174,424
BEVERAGE BREWING APPARATUS
Filed March 31, 1961  9 Sheets-Sheet 4
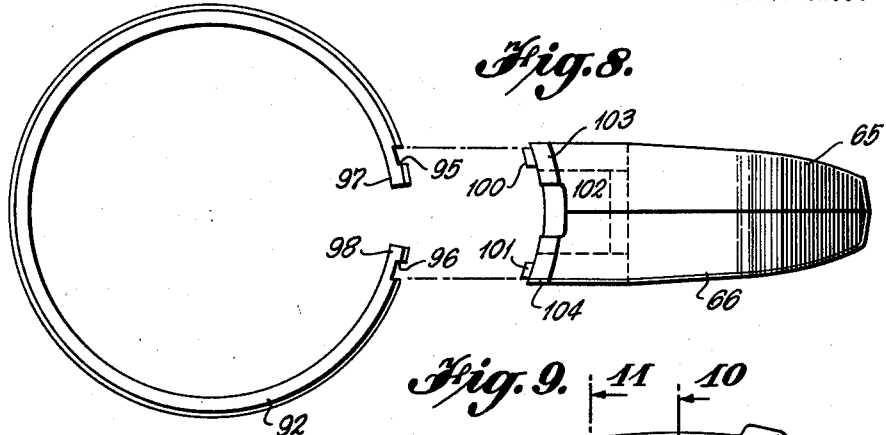
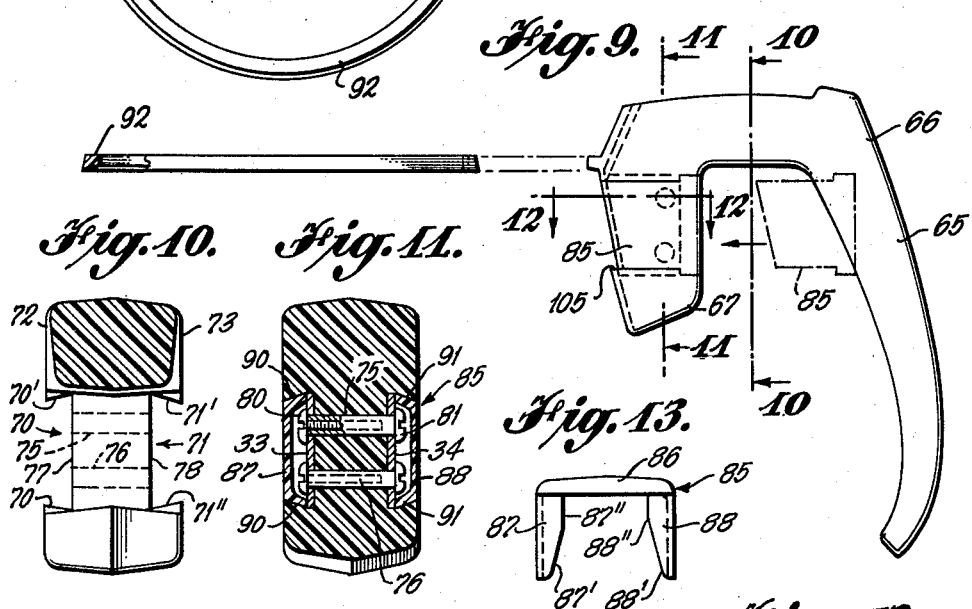
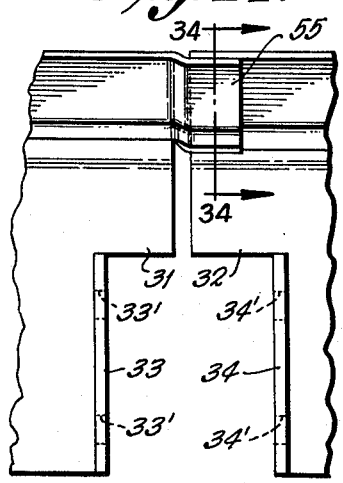
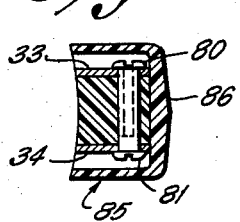
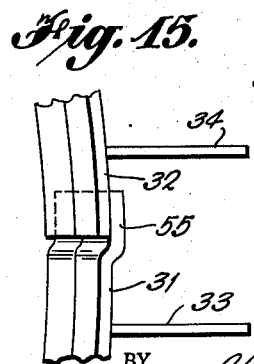
INVENTOR
Anthony W. Serio
BY Shoemaker and Mattare
ATTORNEYS March 23, 1965 A. W. SERIO 3,174,424
BEVERAGE BREWING APPARATUS
Filed March 31, 1961 9 Sheets-Sheet 5
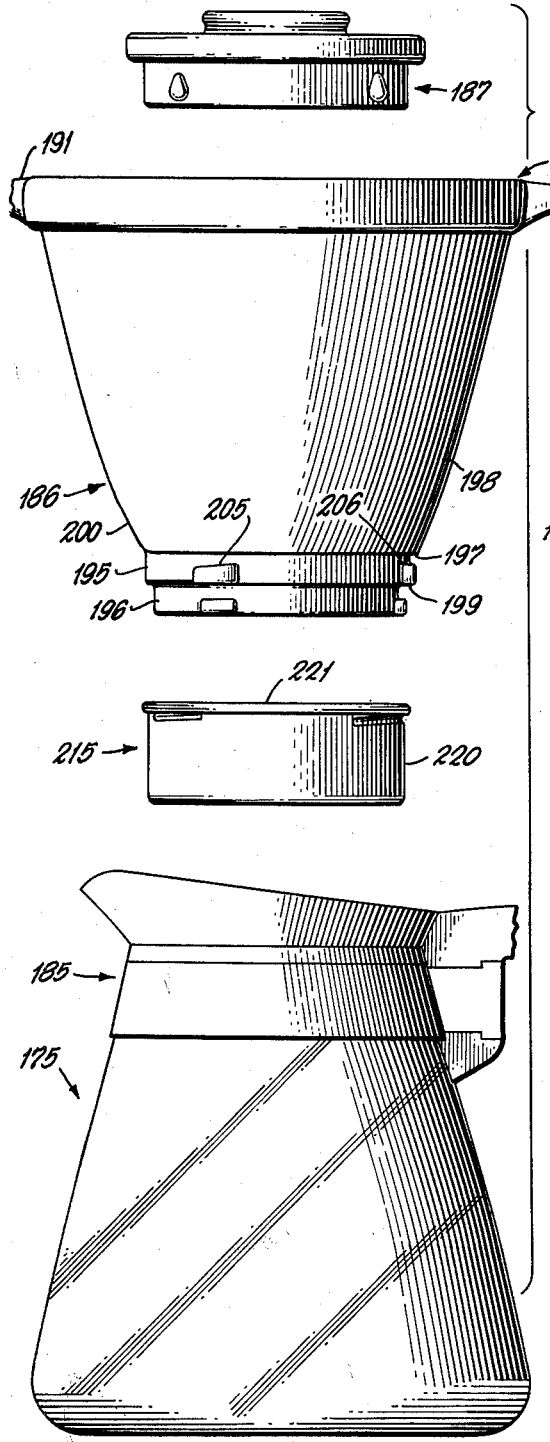
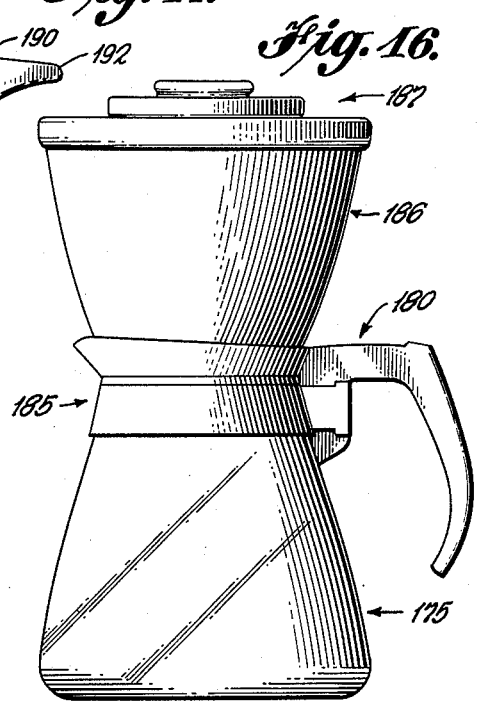
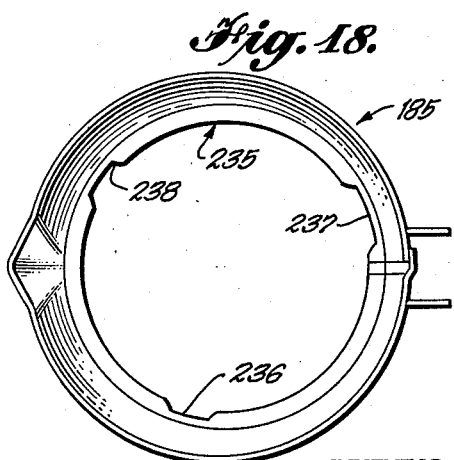
INVENTOR
*Anthony W. Serio*
BY *Shoemaker and Mattare*
ATTORNEYS

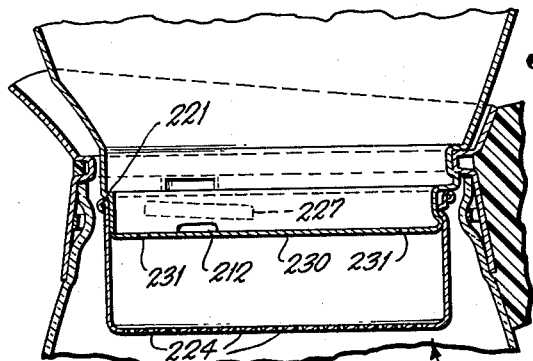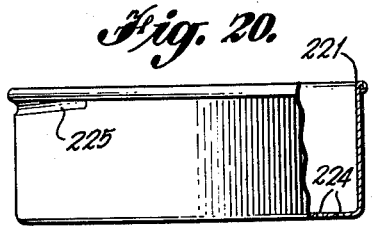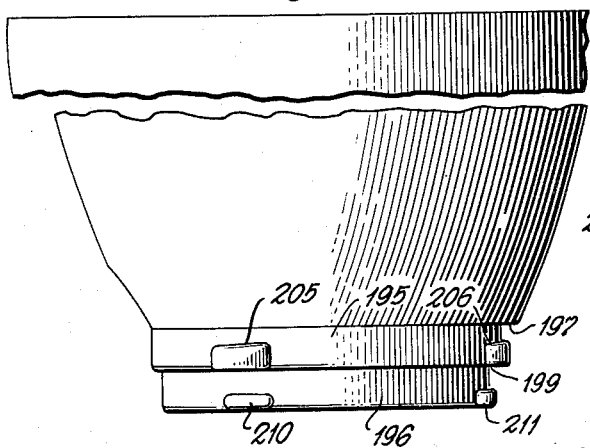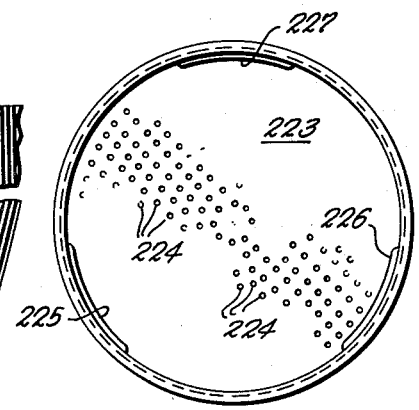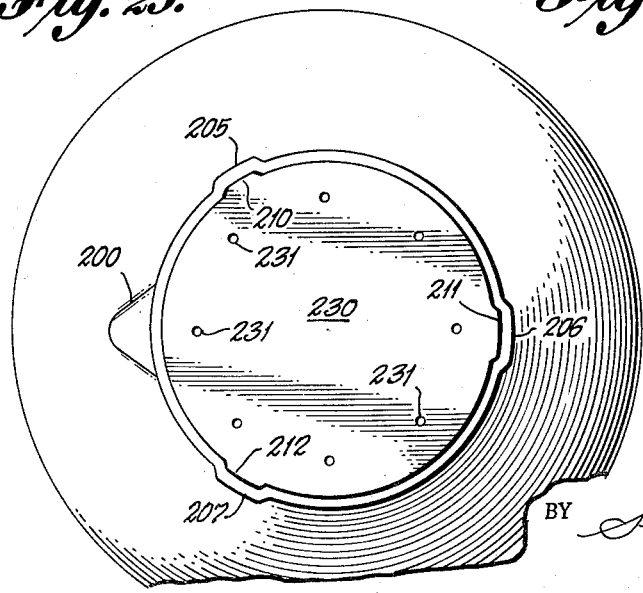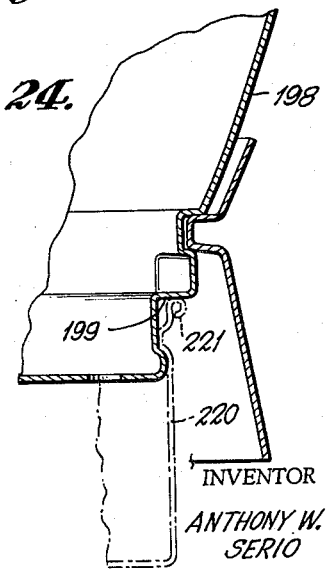
INVENTOR
ANTHONY W. SERIO
BY Shoemaker and Mattare
ATTORNEYS

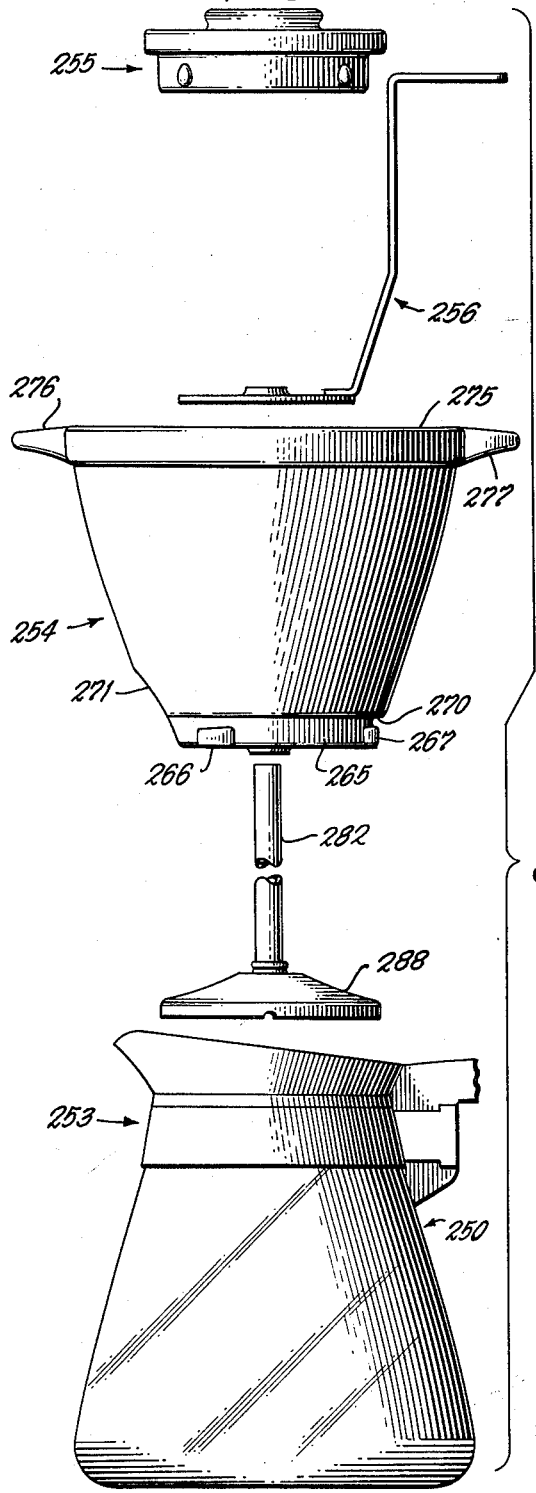

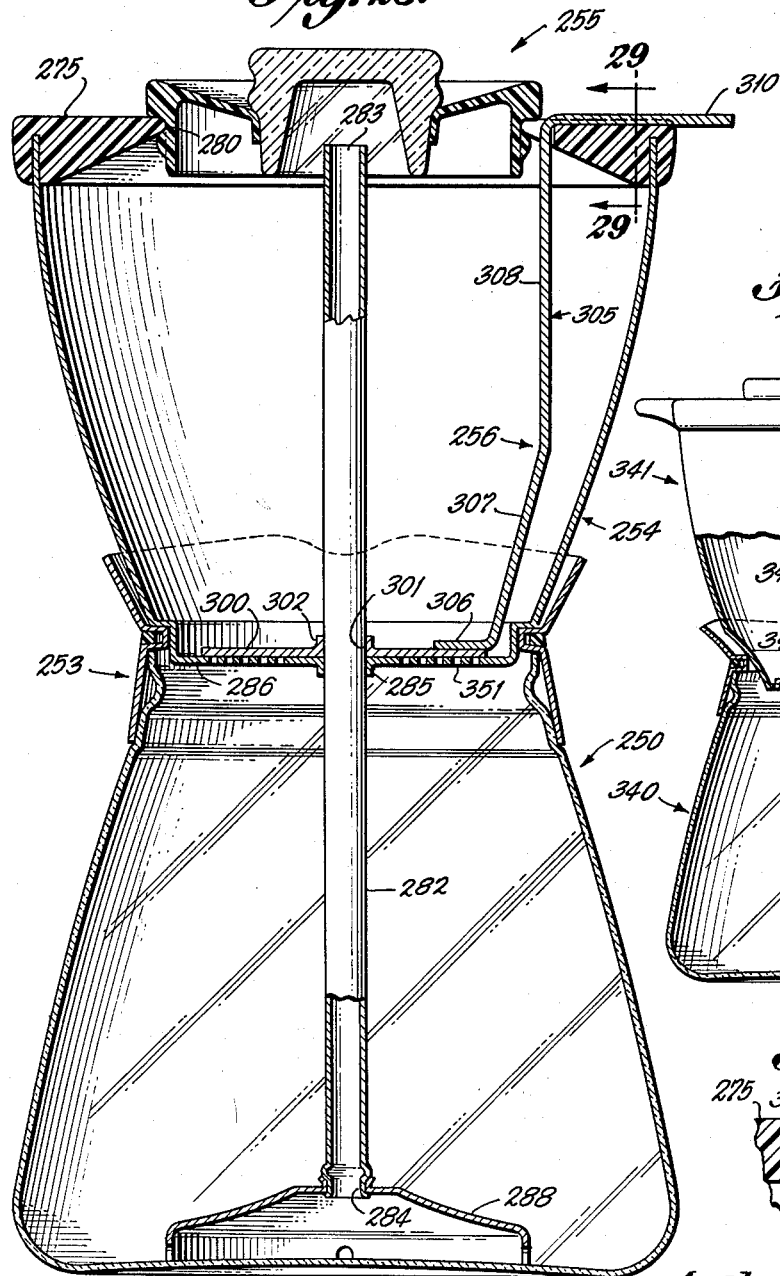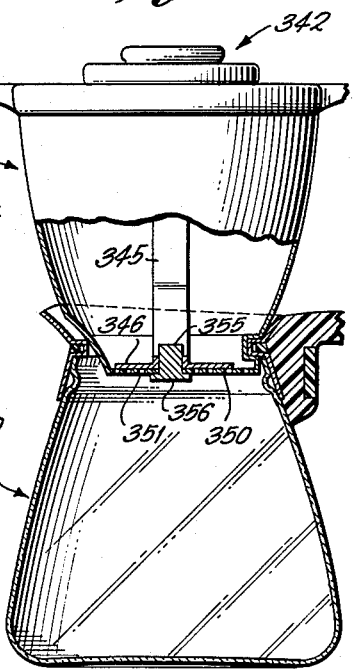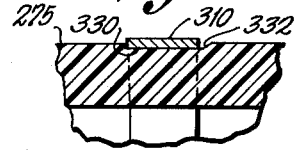

March 23, 1965 A. W. SERIO 3,174,424
BEVERAGE BREWING APPARATUS
Filed March 31, 1961 9 Sheets-Sheet 9

INVENTOR
Anthony W. Serio

BY Shoemaker and Mattare
ATTORNEYS

United States Patent Office 3,174,424
Patented Mar. 23, 1965

3,174,424
BEVERAGE BREWING APPARATUS
Anthony W. Serio, Elmira, N.Y., assignor to Youngstown Steel Door Company, Cleveland, Ohio, a corporation of Ohio
Filed Mar. 31, 1961, Ser. No. 99,865
17 Claims. (Cl. 99—299)

The present invention relates to new and novel beverage brewing apparatus and more particularly to apparatus which is particularly adapted for performing the various types of brewing operations in preparing coffee.

Coffee brewing is carried out by several different methods, two of the most common of which are performed with so-called percolator type apparatus or with dripolator apparatus. In the former case, water is boiled upwardly through a hollow tubular member and then filters downwardly through a mass of coffee grounds, the liquid being continuously recirculated within the apparatus and through the coffee grounds as long as the liquid is maintained at a boiling temperature.

In a dripolator type of brewing operation, the coffee grounds are suspended at the lower portion of a basket and boiling water is poured into the apparatus through an open top portion. This hot water then filters downwardly at a rather slow rate through the mass of coffee grounds, the rate of flow being controlled by the provision of a number of relatively small openings formed in the bottom of a liquid receiving container.

In the prior art, these two types of brewing operations have been generally carried out by quite different types of apparatus employing components which are quite different from one another. In the present invention, however, it is a particular feature that certain components of the arrangement are identical and completely interchangeable with corresponding components in different types of brewing apparatus. That is to say, certain portions of the brewing apparatus employed in a percolator type device may be interchanged with corresponding portions of a dripolator type device. This is, of course, very desirable from an economic standpoint since the manufacturer can make certain basic components which can be utilized with different types of devices thereby reducing the cost involved in manufacturing both a dripolator type and a percolator type beverage brewing apparatus.

Additionally, this arrangement may also result in a substantial saving to the customer who is enabled to have the different types of brewing apparatus while employing certain components in either type of device.

The present invention utilizes a first container means forming the bottom most container or pot which is common to all forms of the apparatus. This basic unit provides a neat appearing container which can be employed as a server or even as a teapot if desired.

Associated with the aforementioned first container means is a second container means which may take different forms according to various modifications of the invention. This second container means is of a unique construction and is so designed that it extends a substantial distance above the top of the first container means. Novel interlocking means is provided between the upper portion of the first container means and the lower portion of the second container means which serves to effectively lock the second container means in place on the upper portion of the first container means.

The second container means has handle portions formed at the upper end thereof and extending laterally thereof whereby the handle portions are accessible at all times and can be easily grasped for manipulating the second container means as desired. The handle means is preferably formed of heat-insulating material thereby eliminating the possibility of burning one's hands when manipulating this container means.

The second container means is adapted to support the mass of coffee grounds at the lower portion thereof and is adapted to receive the boiling water either through a hollow tube in a percolating arrangement, or through the open upper end thereof in a dripolator arrangement.

In prior art arrangements, particularly of the percolator type, the basket which supports the mass of coffee grounds has no handle means formed thereon and is completely received within the lower pot means. Accordingly, when it is desired to remove the coffee grounds from the pot after brewing the coffee, it is necessary to reach down into the pot to grasp the upper end of the basket means. This is very disadvantageous since it is hard to grasp the basket means and furthermore the pot as well as the basket means are very hot thereby often causing a person to burn his fingers when lifting out the basket and certainly in most cases causing quite a bit of discomfort to the person.

All of this awkward type of manipulation which occurs with prior art apparatus is eliminated in the present invention since after having brewed the beverage, the second container means can be readily separated from the first container means by grasping the insulated handle portions which are disposed a substantial distance above the lower pot means and by simply rotating the second container means with respect to the first container means, the interlocking means between the two containers may be released and the two containers readily separated from one another.

By so constructing the second container means such that it extends upwardly above the first container means, the first container means can be made substantially shorter since it is not necessary that the percolator apparatus as well as the basket supporting the coffee grounds be received within the first container means. This results in a shorter, neater appearing pot means and is a definite advantage.

A further important feature of the present invention is the fact that when the second or upper container means is locked in position on the first or lower container means, a recessed area is provided in the second container means which is adjacent to a pouring spout formed on the upper portion of the first container means. This permits the liquid contents of the apparatus to be poured out from the lower container means, and at the same time the second or upper container means is locked in position and can not be accidentally displaced. As a result, the liquid can be readily poured out and the container means supporting the coffee grounds is not displaced as normally occurs with prior percolator devices.

This is important since it will be noted that in prior art devices wherein the basket is more or less freely floating within the pot, the basket tends to fall into the path of liquid being poured out of the pot when the pot is tipped to pour. Accordingly, it is generally desirable to remove the basket before pouring which, of course, is an undesirable feature since the basket is very hot.

When the basket does fall into the path of the flowing liquid as it is poured out of a prior art percolator, there is a possibility that some of the coffee grounds will be entrained in the liquid flow and this is obviously very undesirable.

On the other hand, in the present invention such action can not occur since the container means supporting the coffee grounds is positively locked in position and can not fall into the path of liquid flow as the device is tipped for pouring.

The uppermost container means of the present invention is provided with a central opening which is adapted to receive a cover means. This cover means snaps into place and is adapted to provide an effective seal with the top portion of the uppermost container means. In addition, this same cover means is adapted to snap into place within the central opening formed in the upper portion of the lower container means and to provide an effective seal therewith.

Accordingly, the cover means may be utilized with either the lower container means or the upper container means in an interchangeable manner.

In a modified form of the percolator type apparatus according to the present invention, a flow control means or valve is provided for controlling the flow of liquid through the lower perforated wall of the upper container means. With this arrangement, the liquid may be boiled up through the central tubular member from the lower container means into the upper container means whereupon the liquid forms a pool at the lowermost portion of the upper container means and submerges the mass of coffee grounds contained therein.

The coffee grounds may then be allowed to steep in this hot liquid for a predetermined time whereupon the valve means may be opened and the liquid allowed to drain downwardly through the lower wall of the upper container means. In this manner, the device serves more or less as a combined percolator and dripolator thereby affording a maximum versatility to the device. It is apparent that if so desired, the device may be employed either as a conventional percolator or on the other hand can be used substantially as a conventional dripolator type brewing apparatus.

In a still further modified form of the device, the flow control means may be associated with the upper container means while the hollow tubular member of the percolator arrangement may be eliminated. Accordingly, this type of apparatus will operate similarly to a dripolator type brewing apparatus.

An object of the present invention is to provide new and novel beverage brewing apparatus which incorporates a shorter pot or lower container means and which may be utilized as a server or teapot as desired, and further which provides a neat and attractive appearance.

Another object of the invention is the provision of beverage brewing apparatus which permits the ready removal of the coffee ground supporting container means by use of insulated external handle means thereby eliminating the possibility of burning one's hands when so removing the coffee grounds.

A further object of the invention is to provide beverage brewing apparatus which permits the contents of the lower container means to be readily poured therefrom without the necessity of removing the coffee ground supporting container means and which further prevents any coffee grounds from being entrained in the liquid stream.

Still another object of the invention is the provision of beverage brewing apparatus which incorporates a common lower container means which is interchangeable with the various modified forms of the device, and further an interchangeable top portion is provided which fits both the upper container means and the lower container means of each of the modifications.

A still further object of the invention is to provide a modified form of the apparatus incorporating a flow control means which may be manually adjusted for controlling the amount of time in which the coffee grounds are subjected to a steeping action within a body of hot liquid.

Yet another object of the invention is the provision of beverage brewing apparatus which is quite simple and inexpensive in construction and yet which is quite sturdy and efficient in use.

Other objects and many attendant advantages of the present invention will become more apparent when considered in connection with the specification and accompanying drawings, wherein:

FIG. 1 is an elevation of a percolator type brewing apparatus according to the present invention;

FIG. 2 is a plan view of the device shown in FIG. 1;

FIG. 3 is an exploded elevational view of the device shown in FIG. 1;

FIG. 5 is a sectional view taken substantially along line 5—5 of FIG. 4 looking in the direction of the arrows;

FIG. 7 is a bottom view of the pouring top assembly top portion of the lower container means which is common to all forms of the invention;

FIG. 8 is a top view of a band member and handle portion common to all forms of the invention;

FIG. 9 is a front elevation of the components shown in FIG. 8;

FIG. 10 is a sectional view taken along line 10—10 of FIG. 9 looking in the direction of the arrows;

FIG. 11 is a sectional view taken along line 11—11 of FIG. 9 looking in the direction of the arrows;

FIG. 12 is a sectional view taken along line 12—12 of FIG. 9 looking in the direction of the arrows;

FIG. 13 is a top view of a cover member associated with the handle;

FIG. 14 is an enlarged end view of the free end portion of the pouring top body member;

FIG. 15 is a top view of the enlarged portion shown in FIG. 14;

FIG. 16 is a front elevation of a dripolator type apparatus according to the present invention;

FIG. 17 is an enlarged exploded view of the apparatus shown in FIG. 16;

FIG. 18 is a top view of the pouring top body member of the apparatus shown in FIG. 16;

FIG. 19 is a longitudinal section through the upper portion of the lower container means and the lower portion of the upper container means shown in FIG. 16;

FIG. 20 is a view partly in section of the coffee ground supporting container means as shown in FIG. 19;

FIG. 21 is a top view of the container means shown in FIG. 20;

FIG. 22 is a broken-away view illustrating the construction of the lower portion of the uppermost container means;

FIG. 23 is a bottom view partially broken away of the container means shown in FIG. 22;

FIG. 24 is an enlarged broken-away sectional view illustrating the manner of interconnection of the first and second and third container means of the dripolator type modification;

FIG. 25 is a front elevational view of a percolator-dripolator modification according to the present invention;

FIG. 26 is an enlarged exploded view of the apparatus shown in FIG. 25;

FIG. 27 is a top view of the pouring top body member of the apparatus shown in FIG. 25;

FIG. 28 is an enlarged sectional view through the apparatus shown in FIG. 25;

FIG. 29 is a sectional view taken substantially along line 29—29 of FIG. 28 looking in the direction of the arrows;

FIG. 33 is a view partly in longitudinal section of a further modification of the device comprising a dripolator arrangement employing a flow control means according to the present invention.

Figure 4:
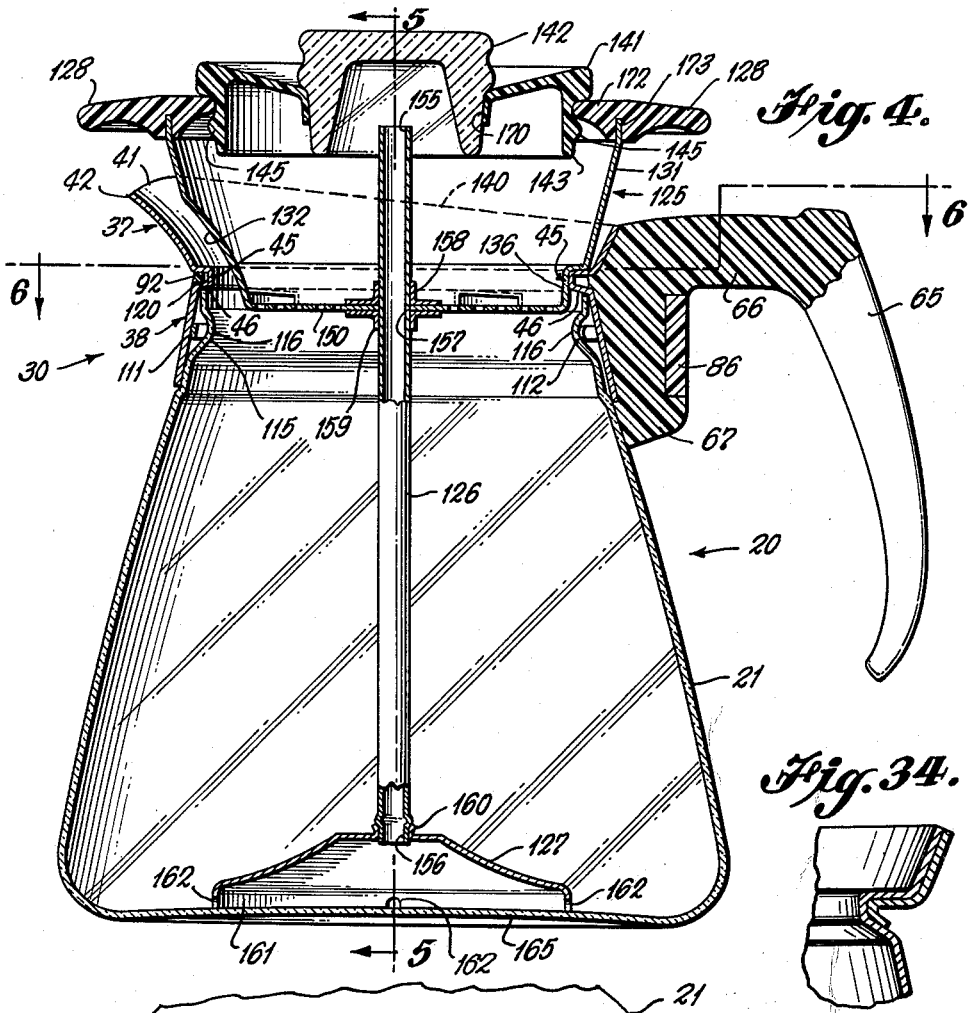
FIG. 4 is an enlarged longitudinal section through the major portions of the apparatus shown in FIG. 1.
Figure 34:
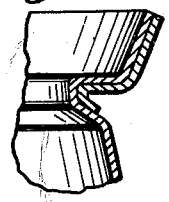
FIG. 34 is a sectional view taken substantially along line 34—34 of FIG. 14 looking in the direction of the arrows.

Referring now to the drawings wherein like reference characters designate corresponding parts throughout the several views, there is shown in FIGS. 1 and 3 a first container means indicated generally by reference numeral 20 including a main body portion 21 formed of a suitable heat-resistant material which may be transparent if desired, and an upper portion or pouring top body member indicated generally by reference numeral 30. The main body portion 21 has sloping side wall portions as seen, and is open at the top portion thereof, the main body portion being of generally circular cross-section.

The main body portion is common in the various modifications of the apparatus, and a pouring top assembly is mounted about the upper edge portion of the main body portion and will now be described in detail.

The construction of the upper portion of the first container means 20 will be more clearly understood from an inspection of FIG. 4, as well as FIGS. 8–15, these latter figures indicating structure which is common to each of the various modifications of the case.

The pouring top body member 30 is formed of a resilient damage-resistant material, and will generally be formed of a metallic substance such as aluminum which is light-weight and yet quite sturdy. The pouring top body actually comprises a split band and as seen in FIG. 14 opposite free end portions 31 and 32 are provided which may normally be spaced from one another. A struck-out ear 33 is formed at end portion 31 and a struck-out ear 34 is formed at end portion 32, these struck-out ears extending substantially parallel to one another as is clear in FIG. 15, the ears each having a pair of openings 33' and 34' formed therethrough respectively, the openings serving as a means for fixedly attaching the ears to an associated handle.

As seen most clearly in FIG. 4, the pouring top body comprises essentially an upper portion indicated generally by reference numeral 37 and a lower portion indicated by reference numeral 38, the lower portion 38 defining a depending flange portion which is adapted to fit about the upper end of the container.

The upper portion 37 of the pouring top body includes a lip portion 40 which extends around the major portion of the periphery of the pouring top body, lip 40 having an enlarged height and an outwardly tapering configuration at portion 41 to define a sharp apex portion 42 which serves as a pouring spout in a well-recognized manner.

The upper and lower portions 37 and 38 of the pouring top body are connected by what may be termed a recessed channel 45 formed in the outer surface of the body means. By so forming this recessed channel, an inwardly extending downwardly facing shoulder 46 is defined on the inner periphery of the pouring top body. It will be apparent that the shoulder 46 slopes upwardly and inwardly, and the recessed channel 45 tapers inwardly from the outer surface of the pouring top body.

It should first be understood that when the ears of the pouring top body are fixedly attached to the associated handle, the pouring top body will be drawn relatively tightly about the container so as to hold the pouring top body on the upper portion of the container.

Referring now to FIGS. 14 and 15, the free end portion 31 of the pouring top body is provided with an integral tongue portion 55 which extends longitudinally from the free end portion 31 and is adapted to abut against and overlap the adjacent portions of the opposite end portion 32 of the pouring top body. The tongue portion 55 is provided with such a configuration that it is complementary to the adjacent surfaces of end portion 32, the tongue seating against the outer surface of the upper part of the pouring top body 30, and also being slidably positioned within the recessed channel 45 of the body. It will be apparent that tongue 55 will snugly fit against the adjacent end portion 32 of the body and in this manner the upper portions of opposite end portions of the pouring top body will always be maintained in intimate contact with one another to prevent leakage of liquid therearound regardless of the fact that the remaining portions of the opposite free ends of the pouring top body may be spaced from one another according to the size of the associated container. Obviously, this is only true within the limits of the tongue 55, but the tongue is made of sufficient length so as to remain in contact with the opposite end portion of the pouring body in all normal applications.

Referring now to FIGS. 8–13 of the drawings, the handle mechanism is illustrated, this handle mechanism being adapted for use with the structure previously described. The handle is preferably formed of a light-weight material such as aluminum and comprises a depending grip portion 65 which is adapted to be manually grasped. The grip portion 65 is formed integral with a top body portion 66 which in turn has a depending body portion 67 formed integral therewith. The entire handle is so formed as to provide a neat and attractive finished appearance.

As seen particularly in FIG. 10, a pair of grooves 70 and 71 are formed in opposite side faces 72 and 73 respectively of the handle. It will be noted that the upper walls 70' and 71' of the grooves taper upwardly toward the central portion of the handle while the lower walls 70" and 71" taper downwardly and inwardly toward the central portion of the handle. In other words, the upper and lower walls of each of the grooves are tapered oppositely to one another and form what may be termed dove-tail grooves which coact in a novel manner with the associated structure as hereinafter described.

Also as seen in FIG. 10, a pair of openings 75 and 76 are provided between the inner walls 77 and 78 of the two grooves. When in assembled position, the ears 33 and 34 the pouring top body are received in the grooves formed in the handle and are disposed at the bottom of the grooves as seen in FIG. 11. The ears are fixedly attached to the handle by means of screw assemblies, each of which includes a first threaded screw member 80 which threads into an internally threaded tubular member 81, each of members 80 and 81 having enlarged heads formed at the outer ends thereof.

In order to provide a neat finished appearance and to completely hide the attaching screws from view, a cover member is provided, this cover member being shown in FIGS. 9, 11 and 13, and being indicated generally by reference numeral 85. As seen in FIG. 13, cover member 85 is susbtantially U-shaped in top plan and includes a rear wall portion 86 and a pair of side leg members 87 and 88. As seen from the top in FIG. 12, each of side walls 87 and 88 includes an inwardly tapered portion 87' and 88' which joins integral portions 87" and 88" respectively adjacent the rear wall portion 86 of the cover. Portions 87' and 88' are spaced from one another slightly less than the spacing of the side walls 77 and 78 of the grooves formed in the handle. The cover is preferably formed of a slightly flexible material such as plastic and accordingly when the cover is inserted in operative position, friction will be developed between surface 87' and 88' and the adjacent surfaces 77 and 78 on the handle to hold the cover in operative position.

As seen in FIG. 11, the legs 87 and 88 are relatively thin at their central portions, and the upper and lower edge portions 90 of leg portion 87 extend inwardly to define inwardly extending flanges while the upper and lower edge portions 91 of leg portion 88 also extend inwardly to form inwardly extending flanges. The upper and lower surfaces of these inwardly extending flanges 90 and 91 are tapered in a manner complementary to the taper formed in the upper and lower walls of the grooves formed in the handle.

It will be also noted that the construction of the cover is such as to permit reception of the enlarged heads of the attaching screws between the flanges formed at the upper and lower portions of the legs of the cover.

It will be evident that the cover can be slidably removed from its operative position as seen in FIG. 9 by pulling the rearward ends to the dotted line position. Of course, when it is desired to assemble the cover in operative position, it is slipped into position in the direction of the arrows shown in FIG. 9, and when in such position, the outer surface of the cover means fits flush with the outer surface of the handle.

Referring now particularly to FIGS. 8 and 9, a split band member 92 formed of a suitable material such as plastic and having a cross-sectional configuration as seen in FIG. 9 is adapted to snugly fit within the outer portion of the recessed channel 45 formed in the body member 30. This band may be seen in place for example in FIG. 4 and the band serves to form a relatively flush outer surface for the body member 30 and gives a neat appearance thereto. Notches 95 and 96 are provided in the outer surface of the band 92 adjacent the opposite free ends 97 and 98 thereof respectively, these notches serving to retain the band in operative position as will hereinafter appear.

The forward face of the handle adjacent to the pouring top body is so configured as to seat flush against the adjacent free end portions of the body. The handle includes a pair of forwardly projecting lugs 100 and 101, the outer ends of these lugs being so configured as to snugly fit within the notches 95 and 96 formed in the ring-shaped band member 92.

Lugs 100 and 101 are connected by sloping wall portions 103 and 104 to the upper surface of the portion 66 of the handle. These sloping surfaces 103 and 104 are adapted to fit snugly against the adjacent portions of the pouring top body.

A cut-out portion 102 is provided between the forwardly projecting lugs, this cut-out portion 102 being provided for receiving the tongue 55 formed on one free end of the pouring top body when in assembled position thereby providing a compact relatively flush structure.

As seen in FIGS. 4 and 9, the downwardly extending portion 67 of the handle is also provided with a forwardly projecting shoulder 105 which is adapted to fit under the lower edge of the adjacent free end portion of the pouring top body and in this manner the handle is adapted to fit snugly against and around the adjacent portions of the pouring top body.

Referring now to FIG. 7, a bottom view of the top portion of the first container means is illustrated, and as seen in this figure, a plurality of spring means 110 shown as being three in number are illustrated. These spring means have the central portions 111 thereof spot welded or otherwise secured to the inner surface of the depending portion 38 of the pouring top body. Extending from opposite ends of the central body portion 110 and inwardly away from the inner wall of depending portion 38 of the pouring top body are leaf spring arms 112, these arms having a generally semi-circular cross-sectional configuration.

Referring now to FIG. 4, it will be noted that a peripherally extending groove 115 is formed in the outer surface of the main body portion 21, this peripheral groove 115 including a downwardly and inwardly sloping wall portion 116 which is adapted to be engaged by the various leaf spring arms 112. One of these arms 112 is seen in FIG. 4 in engagement with the wall of the groove.

When the pouring assembly is initially mounted in operative position about the upper end of the main body portion 21, the leaf spring arms 112 which are biased inwardly will engage the downwardly and inwardly sloping wall portion 116 of the groove thereby creating a cam action and pulling the entire body 30 downwardly such that the downwardly facing shoulder 46 formed by the bottom of the channel portion 45 may be brought into engagement with the upper edge of the main body portion 21.

Prior to so assembling the components, a suitable sealing and bonding compound is placed along shoulder 46 particularly adjacent to the depending portion 38 of the pouring top body member. For example, a layer of sealing material identified as "Sealistic" manufactured by the Dow-Corning Corporation of Midland, Michigan may be employed. This layer of sealing material subsequently forms a permanent seal between the upper edge of the main body portion 21 and the top body portion, this layer being indicated by reference numeral 120 in FIG. 4.

Referring again to FIG. 3 of the drawing, a second container means 125 is illustrated, this second container means having attached thereto a depending tubular portion 126 having a dome member 127 secured to the lower end thereof. A pair of laterally extending insulated handle portions 128 are provided, these handle portions being formed of a suitable material such as plastic or the like. The main body portion 130 of the second container means may be formed of stainless steel or similar material, and it will be noted that the side wall 131 thereof tapers downwardly and inwardly. A recessed area 132 is provided at one side of the container for permitting pouring of liquid from the aforementioned lower container means as will hereinafter more fully appear.

Figure 6:
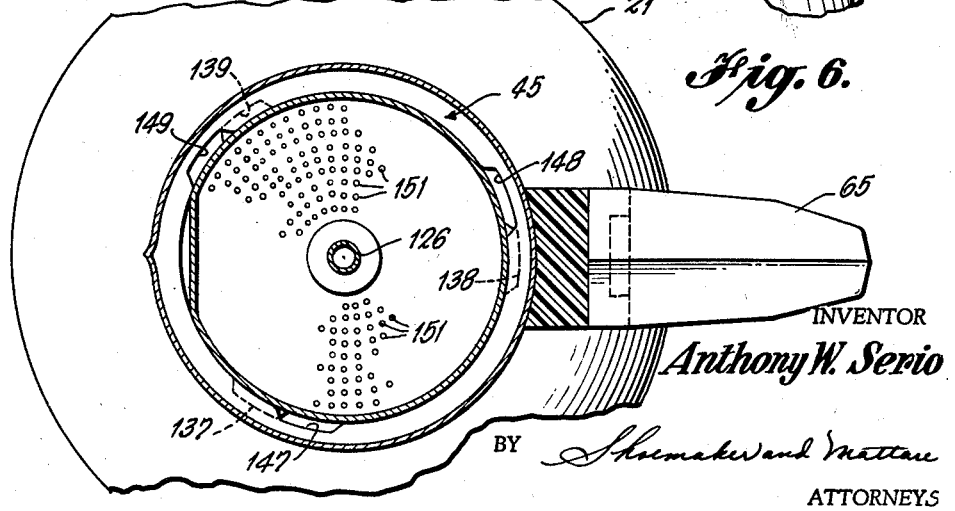
FIG. 6 is a sectional view taken substantially along line 6—6 of FIG. 4 looking in the direction of the arrows.

It will be noted that a downwardly facing shoulder portion 135 is formed peripherally around the second container means except for that portion which is recessed at 132. The depending wall portion 136 of the second container means is provided with a plurality of outstanding locking members or lugs 137, 138 and 139 as seen in FIG. 6, only two of these locking members being visible in FIG. 3. The locking members are equally spaced about the periphery of the depending wall 136, and may be of any number, although three is considered preferable.

As seen in FIG. 3, the upper surface 137' of lug 137 slopes downwardly and to the left as seen in the figure, and it will be understood that the top surfaces of the other locking members 138 and 139 are sloped in a similar manner relative to the second container means. These locking members are preferably formed by making embossments in the depending wall portion 136 such that the locking member portions are integral with the wall portion 136 and project radially outwardly thereof.

As seen at the top portion of FIG. 3, a cover means 140 is provided, this cover means including a main body portion 141 formed of plastic or the like and a central portion 142 which may be formed of a suitable transparent material such as glass in order that a person may observe the percolating action which takes place within the apparatus.

The depending wall portion 143 of the cover means is provided with a plurality of outstanding integral projections 145 which serve to lock the cover means in place as will hereinafter appear.

Referring now to FIGS. 6 and 7 of the drawing, the channel-shaped portion or rib 45 of the pouring top body member is provided with three spaced recesses 147, 148 and 149, these recesses being formed in the inner surface of the channel-shaped portion by pressing this inner surface radially outwardly. The recesses 147, 148 and 149 are equally spaced about the inner periphery of the channel portion, and are of such dimension as to receive the lugs 137, 138 and 139, respectively, formed on the outer surface of the lower portion of the second container means 125.

The lug 138 as well as the recess 148 have a slightly greater length than the remaining lugs and recesses thereby ensuring that the second container means can only be inserted in operative position in one particular relationship.

The second container means 125 is shown in operative position in FIG. 4, and it is so secured in this operative position by lowering the second container means such that the locking members or lugs thereon pass through the recesses 147, 148 and 149 whereupon the second container means is rotated in a clockwise direction as seen from above.

This clockwise rotation of the second container means with respect to the first container means will cause a cam action since the sloping upper surfaces of lugs 137–139 will cause the second container means to be pulled downwardly toward the first container means. This downward movement causes the surface of downwardly facing shoulder 135 to be pressed tightly against the upper surface of the channel portion or rib 45 on the pouring top body member 30 thereby ensuring that the second container means is tightly locked and sealed with respect to the first container means. At the same time, while the second container means is so locked in operative position, it will be apparent that liquid may be poured between the recessed area 132 of the second container means and the adjacent part of the top portion of the first container means and thence through the pouring spout portion.

A mass of coffee grounds is supported in the lower portion of the second container means 125 when in operation, and the lower wall 150 of the second container means is perforated throughout the major portion thereof as indicated by numerals 151 in FIG. 6. This construction is similar to the construction of conventional percolator baskets.

The tubular member 126 has an open upper end portion 155 and an open lower end portion 156 in a conventional manner and an intermediate portion of the tubular member extends through a central opening 157 formed in the lower wall 150 of the second container means. A pair of attaching members 158 and 159 are employed for rigidly securing and sealing the tubular member in place with respect to the second container means.

The dome member 127 is secured at 160 in a conventional manner to the lower end of tubular member 126, the dome member having a relatively conventional configuration as is common in percolator type brewing apparatus, the lower edge 161 of the dome member having a plurality such as four semi-circular notches 162 formed therein for permitting free flow of liquid into the interior of the dome member. It will also be noted that the lower wall 165 of the main body portion 21 of the first container means has an arched configuration, the highest point of which is at the central portion of the container.

Referring now to the top portion of FIG. 4, it will be seen that the glass portion 142 of the cover means is fixed and preferably glued within a central opening 170 formed in the main body portion 141. It will be noted that the upper portion of the depending wall 143 is snugly received within the inner wall of rim portion 172 forming the topmost portion of the second container means 125. It will be seen that the main body portion 131 of the second container means is received within a suitable groove 173 provided in member 172 and is suitably secured therein by means of glue or the like. The handle portions 128 are formed integral with member 172, both of these portions being formed of heat-insulating plastic thereby enabling a person to grasp these handle portions without any danger of burning the fingers while the device is in use.

The projections 145 formed on the outer surface of the cover means snap behind the inner lip of member 172 of the second container means thereby locking the cover means in position as shown. The cover means may be readily separated by grasping the central portion 142 of the cover means and pulling upwardly thereon.

Referring now to FIGS. 16–24 of the drawings, the dripolator modification of the invention is illustrated. In this modification, the first container means 175 is of identical construction with the previously described first container means 20 in the modification shown in FIGS. 1–7.

It will be understood that the various components shown in FIGS. 8–15 are also incorporated in the modification shown in FIGS. 16–24. As in the previously discussed modification, a handle portion indicated generally by reference numeral 180 is provided, this handle portion being associated with a pouring top body member 181 which encircles the upper portion of the container.

A second container means indicated generally by reference numeral 186 extends upwardly above the top of the pouring top assembly, and a cover means 187 is provided, this cover means 187 being identical in all respects with the previously discussed cover means 140.

The second container means 186 in this modification is of modified construction. The uppermost portion thereof including the insulated part 190 having handle portions 191 and 192 integral therewith and extending laterally therefrom is identical with the portion 172 as seen for example in FIG. 4, and, of course, the cover means 187 cooperates therewith as aforedescribed.

The lower portion of the second container means 186 as seen especially in FIG. 17 is provided with a first depending wall portion 195 and a second depending wall portion 196, each of these wall portions being of circular cross section and being of cylindrical construction, wall portion 196 being of less diameter than wall portion 195. A first downwardly facing shoulder means 197 is provided between the main body portion 198 of the second container means and the depending wall portion 195, while a second downwardly facing shoulder 199 is provided between the depending wall portions 195 and 196. It will be understood that the first shoulder 197 extends peripherally around the lower part of the main body portion 198 except for a recessed portion 200 provided for facilitating pouring as aforedescribed, while the downwardly facing shoulder 199 extends completely around the second container means.

A first plurality of outstanding locking members or lugs 205, 206 and 207 are formed outwardly of depending wall 195 and have sloping upper surfaces thereon similar to the locking members 137, 138 and 139 of the previously described modification.

The depending wall portion 196 is also provided with three spaced outwardly projecting lugs 210, 211, and 212, these lugs being substantially aligned with the previously described locking members as seen especially in FIG. 23.

In the instant modification, a third container means 215 is provided, this container means having a substantially vertically extending side wall 220 formed of stainless steel or the like, a resilient bead or lip 221 being formed around the upper edge thereof. As seen most clearly in FIG. 21, the lower wall 223 of the third container means is provided with a plurality of perforations 224 throughout the major portion thereof as in the baskets of conventional coffee brewers.

Also as seen in FIG. 21, there are provided in the side wall 220 of the third container means three equally spaced inwardly projecting lugs 225, 226 and 227. These radially inwardly extending lugs have upwardly sloping lower surfaces formed thereon as seen particularly in FIGS. 19 and 20. Accordingly, when it is desired to mount the third container on the lower portion of the second container means, the third container means is inserted around the depending wall portion 196 of the second container means and rotated in a clockwise direction as seen from above whereby the lower surfaces of the inwardly extending lugs 225, 226 and 227 will engage the upper surfaces of lugs 210, 211 and 212 thereby producing a cam action moving the third container means upwardly to seal the resilient lip 221 formed thereon against the downwardly facing shoulder 199 formed on the second container means. This finally sealed position is illustrated in enlarged detail in FIG. 24.

It will be understood that the coffee grounds are supported within the third container means and that liquid may flow rather freely through the perforations in the bottom wall 223 thereof. On the other hand, the lower wall 230 of the second container means is provided only with a few perforations 231 formed therethrough and shown as being eight in number. With this arrangement, hot liquid such as water will trickle rather slowly through openings 231 and into the coffee grounds suspended within the third container means 215 whereupon the water will filter downwardly through the coffee grounds and subsequently out through the perforations 224 into the lower container means 175.

As seen in FIG. 18, the pouring top body member 185 is of identical construction with the body member 30 of the modification shown in FIGS. 1–7 and includes an inwardly projecting channel portion or rib 235. This rib 235 has three recesses 236, 237 and 238 formed in the inner surface thereof, these recesses being adapted to receive the lugs 205, 206 and 207 respectively formed on the second container means. It is evident that the second container means may be clamped and sealed to the upper portion of the first container means in this modification in the same manner as previously discussed, and the liquid can be poured out of the lower container means without displacing or removing the second container means. Furthermore, the second container means may be readily manipulated with respect to the first container means by utilizing the insulated handle portions 191 and 192.

Referring now to FIGS. 25–32, a percolator-dripolator modified form of the invention is provided. In this modification, a first container means 250 is provided, this container means being in all respects identical with the lower container means previously described and including a handle portion 252 and a pouring top body member 253 disposed around the upper open end thereof. A second container means 254 is provided, and a cover means 255 is of identical construction with the cover means heretofore described.

An additional element comprising a flow control means is indicated generally by reference numeral 256 in FIG. 26, and the construction and utilization of this flow control means will be hereinafter more fully described.

As seen in FIG. 27, the pouring top body member 253 is provided with an inwardly projecting channel portion or rib 260 identical to the channel portions previously discussed, and three spaced recesses 261, 262 and 263 are formed in the inner surface of the portion 260.

At the lower portion of the second container means 254, a depending wall 265 is provided, this wall having three locking members 266, 267, and 268 formed on the outer surface thereof. These three locking members can be seen most clearly in FIG. 31 wherein it is seen that the lugs 266, 267 and 268 project radially outwardly from the depending wall portion 265.

Here again, lug or locking member 267 and recess 262 are of greater length than the remaining lugs and recesses such that the second container means can only be secured in one relative position with respect to the first container means.

A downwardly facing shoulder 270 is provided which is adapted to seal against the upper surface of the inwardly directed channel portion 260 of the body member 253 when the second container means is secured in operative position by rotating the second container means with respect to the first container means.

A recessed area 271 is provided at the lower portion of the second container means 254 to enable pouring of liquid between the second container means and the top portion of the first container means as will be well understood from the previous description.

As seen in FIGS. 26 and 28, the top portion 275 of the second container means is formed of a suitable insulating material such as plastic or the like and has integral therewith laterally extending handle portions 276 and 277 which, of course, enable the second container means to be readily handled and manipulated as desired.

Referring now particularly to FIGS. 25 and 28, the second container means is illustrated in operative position on the first container means, and it will be seen that the cover means 255 is sealingly engaged within the central opening 280 provided in the top portion 275 of the second container means. A tubular member 282 is provided with an open upper end 283 and an open lower end 284. Tubular member 282 is adapted to be snugly received within a central opening provided through the bottom wall 286 of the second container means, and a depending collar portion 285.

A dome member 288 of the same construction as dome member 127 previously discussed is fixed to the lower end of tubular member 282.

Figure 31:
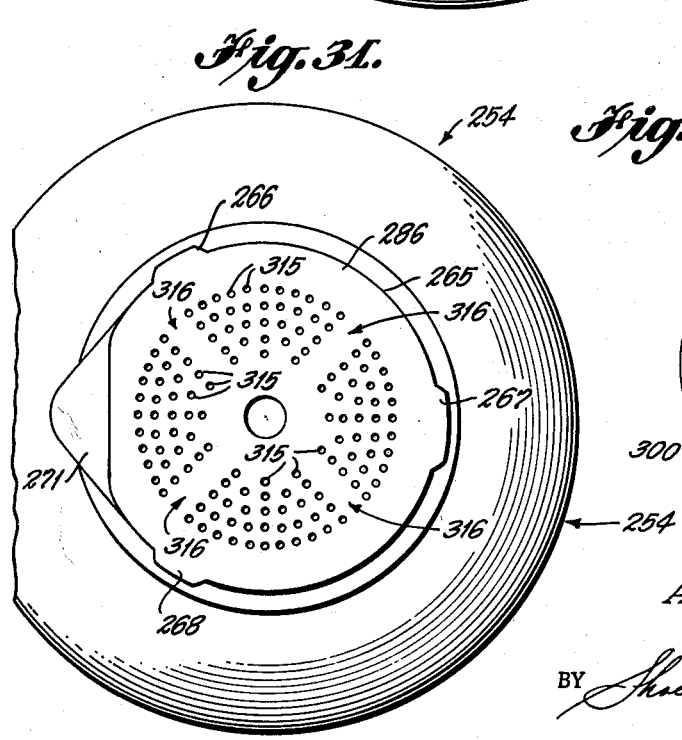
FIG. 31 is a bottom view of the upper container means of the apparatus shown in FIG. 25.

As seen in FIG. 28, the flow control means 256 includes a lower disc-like plate member 300 which as seen in FIG. 31 is of circular configuration, and an opening 301 is formed through the central portion thereof and an axially extending collar 302. Tubular member 282 also extends through the central opening in the plate portion 300 thereby supporting the flow control means for rotation about the longitudinal axis of the tubular member.

Figure 32:
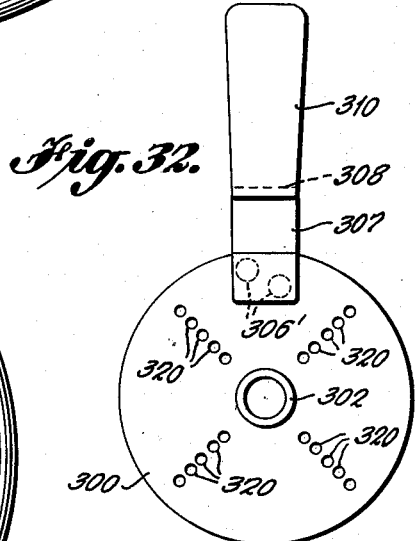
FIG. 32 is a plan view of the valve control means of the dripolator-percolator modification.

An actuating means for the plate member comprises an arm 305 having a lowermost portion 306 which is spot welded as indicated in FIG. 32 by reference numerals 306' to the upper surface of the plate portion 300. The arm 305 also includes an angular portion 307 extending upwardly from portion 306 and a vertically extending portion 308 which terminates in a normally extending portion 310 extending laterally outwardly of the top portion of the second container means such that it may be readily manually grasped.

Referring to FIG. 31, it will be seen that the bottom wall 286 of the second container means is provided with a plurality of perforations 315, these perforations being arranged in four groups so as to provide four solid radially extending portions 316 between the adjacent groups of perforations.

Referring now to FIG. 32, it will be noted that plate member 300 of the flow control means is provided with a plurality of openings 320, these openings being formed as four radially extending groups of openings.

When the plate member is disposed in abutting relationship with the upper surface of the bottom wall of the second container means such that the openings 320 therein are centered along the solid radially extending portions 316 of the bottom wall, the flow control means or valve is in closed position such that substantially no liquid will flow from the second container means downwardly through the perforations 315 in the lower wall thereof.

Means is also provided for permitting the flow control means to be moved to an open position whereby liquid may flow downwardly through the perforations in the bottom wall of the second container means. For this purpose, the upper portion 275 of the second container means is provided with an arcuate cut-out portion 325 as seen in FIG. 30 which is provided along an arcuate portion of the inner edge 326 of the central opening provided through member 275.

Figure 30:
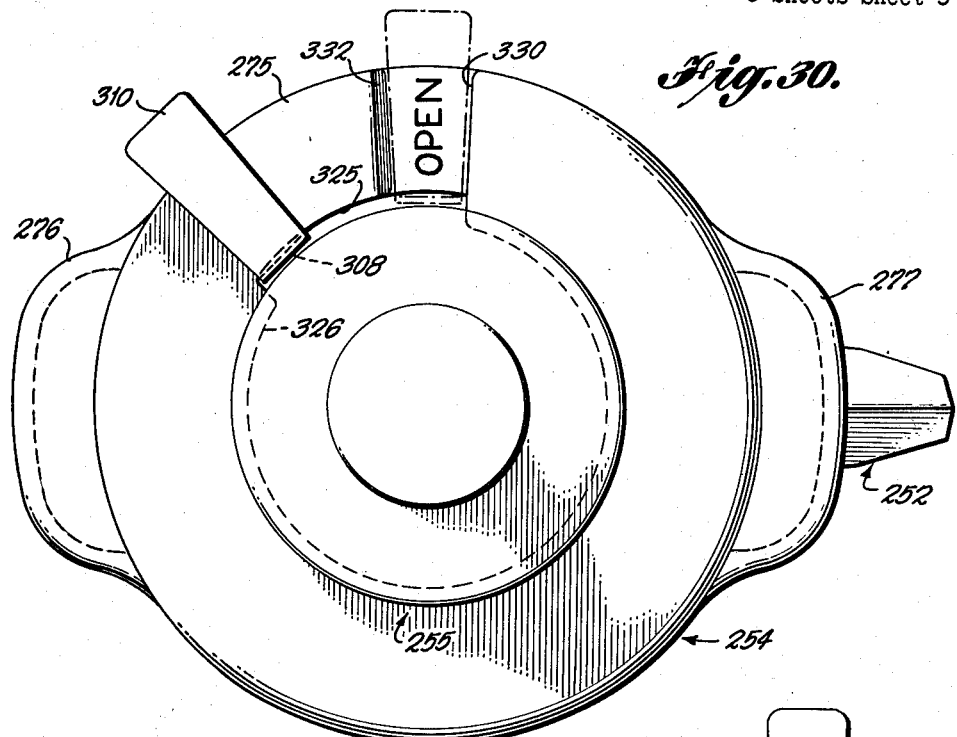
FIG. 30 is an enlarged top view of the apparatus shown in FIG. 25 illustrating the position of the components when the flow control means is in open position.

This arcuate recessed portion 325 is adapted to receive the vertically extending portion 308 of the flow control means, and permits the flow control means to be moved to the open position as indicated in solid lines in FIG. 30. When the arm of the flow control means is moved into the solid line position, a radially extending recessed portion 330 provided in the upper surface of portion 275 of the second container means is exposed, and the word "OPEN" is suitably incribed in the lower surface of the recess 330 and becomes visible thereby indicating that the flow control means has been moved to an open position. It is apparent that when the portion 310 is moved to the phantom line position shown in FIG. 30, the word "OPEN" will be hidden from view and the flow control means will be in its closed position.

Referring now to FIG. 29, the radially extending recessed portion 330 is shown as being formed in the upper surface of portion 275, and the laterally extending portion 310 of the arm of the flow control means is shown as seated within the recess such that the flow control means is in its closed position.

It will be noted that a sloping wall portion 332 joins the lower wall of recess 330 with the upper surface of portion 275, this sloping wall portion serving as a cam means such that upon rotation of the arm portion 310 with respect to the second container means from its closed position toward its open position, the arm 310 will be cammed upwardly onto the upper surface of portion 275 thereby lifting the entire flow control means including the plate member 300 upwardly away from the lower wall of the second container means. Upon such actuation of the arm 310 toward its open position, the plate member will not only be lifted upwardly away from the lower wall of the second container means, but the openings 320 provided through plate member 300 will be misaligned with the solid portions 316 of the lower wall of the second container means thereby ensuring that liquid can flow downwardly through the perforations 315 in the bottom wall of the second container means.

The device illustrated in FIGS. 25–31 is adapted to operate as a combined percolator or dripolator apparatus. It is evident that when the flow control means 256 is in its open position thereby permitting free liquid flow downwardly through the perforations in the bottom of the second container means, the device is adapted to operate as a conventional percolator since the liquid will boil up through the tubular member 282 and thence will filter downwardly through a mass of coffee grounds disposed in the bottom portion of the upper container.

On the other hand, if it is desired to obtain a dripolator effect, the valve may be closed or only partially open. Hot water is disposed in the upper container and submerges the mass of coffee grounds. If the valve is completely closed, the coffee grounds will steep in this hot liquid for a desired length of time, whereupon the valve may be fully opened if desired. As an alternative arrangement, the valve may be maintained only partially opened such that the hot liquid in the upper container will drip down at a relatively slow rate through the coffee grounds and the perforations formed in the bottom wall of the upper container. It is also apparent that if desired the water may be boiled up through the tubular member 282 and allowed to form a pool on the bottom of the upper container if the valve is closed, or to filter slowly downwardly through the coffee grounds if the flow control means is only partially opened.

Referring now to FIG. 33 of the drawings, a further modified form of the invention is illustrated which is similar in many aspects to the apparatus shown in FIG. 28.

In the modification shown in FIG. 33, the lower or first container means 340 is of identical construction with the container means 250 shown in FIG. 28 while the upper container means 341 is of identical construction with the container means 254 shown in FIG. 28. Here again, the cover means 342 is the same as the cover means previously described. Also in the modification shown in FIG. 33, the flow control means 345 is identical with the flow control means 256 shown in FIG. 28, the plate member 346 of the flow control means being provided with perforations similar to perforations 320 as seen in FIG. 31. The bottom wall 350 of the upper or second container means is provided with a plurality of perforations 351 formed therethrough, these perforations 351 being formed in four distinct groups similar to that shown in FIG. 31 whereby the plate member 346 is adapted to control the liquid flow therethrough.

The distinctive structure of the modification shown in FIG. 33 as compared to the structure shown in FIG. 28 lies in the elimination of the tubular member 282 of the previous modification and the substitution of a solid stud member 355 which has an enlarged head 356 at the lower end thereof. This stud member 355 extends through central openings provided in the plate member 346 of the flow control means and the lower wall 350. The stud member 355 is suitably secured in fixed sealing relationship with respect to the bottom wall 350 and it will be seen that member 355 provides a pivotal support for the flow control means 345.

The modification shown in FIG. 33 is adapted to operate as a dripolator type apparatus wherein hot water is poured through the central opening in the upper container. Here again, the flow control means 345 may be manually actuated for selectively controlling the liquid flow through the coffee grounds and thence through the perforations 351 in the lower wall of the upper container.

It is apparent from the foregoing that there is provided new and novel brewing apparatus wherein a unique arrangement is provided in that a container extends upwardly above the top of the lower pot or first container means thereby permitting the lower container to be of a substantially shorter construction than heretofore possible in the art, this lower container presenting a very neat and attractive appearance enabling it to be effectively employed as a server or even as a teapot if desired.

The container which extends upwardly below the lower container is provided with insulated handle portions which permit this upwardly extending container to be readily handled and manipulated without the possibility of burning one's hands. With this arrangement, the coffee grounds may be easily removed from the apparatus even when the container components thereof may be quite hot. The upper container means is locked in position with respect to the lower container means and clearance is provided therebetween such that the liquid of the lower container can be poured therefrom without removing the upper container, and a particular advantage of this arrangement is that there is no possibility of entraining coffee grounds in the flowing liquid as it is poured from the container. The lower container is interchangeable in each of the various modifications as well as the cover means for the different modifications. This cover means also is adapted to fit either the upper container or the lower container in each of the modifications. A modified form of the invention is provided wherein a flow control means or valve is employed for controlling the flow of liquid from the upper container means into the lower container means thereby permitting selective adjustment of the brewing action. The apparatus is quite simple and inexpensive in construction, and yet is quite sturdy and efficient in use.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Beverage brewing apparatus comprising first container means having a main body portion formed of heat-resistant material and a top portion, said top portion having a pouring spout portion formed thereon, said top portion also including an inwardly directed rib means extending peripherally therewithin, said rib means having a plurality of spaced recessed portions formed on the inner periphery thereof, second container means disposed within said top portion and extending a substantial distance thereabove, said second container means including a downwardly facing shoulder adapted to rest on the upper surface of said rib means, the lower portion of said second container means including a plurality of spaced outwardly extending locking members adapted to be received through said recessed portions and to clamp the second container means in place on the first container means upon relative rotation of said first and second container means, the bottom portion of said second container means being perforated for permitting liquid flow therethrough, the lower portion of said second container means being recessed adjacent said pouring spout portion of the first container means to permit fluid to pass between said second container means and said top portion.

2. Apparatus as defined in claim 1, wherein said locking members have a sloping upper surface adapted to produce a cam action and to wedge said second container means against said first container means upon relative rotation therebetween, one of said recessed portions and one of said locking members being of greater size than the remaining recessed portions and locking members respectively to ensure that the second container means is assembled in a particular relationship to said first container means.

3. Apparatus as defined in claim 1, including handle means disposed at the upper portion of said second container means for facilitating handling and manipulation of said second container means.

4. Apparatus as defined in claim 1, wherein said second container means has an open top portion and a cover means, said cover means being of such a dimension as to fit snugly within the open top portion of said second container means as well as to fit snugly within the opening defined by the inner periphery of said inwardly directed rib formed on the top portion of said first container means.

5. Beverage brewing apparatus comprising first container means having a main body portion formed of heat-resistant material and having a top portion surrounding the upper edge of said main body portion, said top portion including a pouring spout portion, said top portion having an inwardly directed channel portion formed therein and extending peripherally thereof, said channel portion having a plurality of spaced recesses formed in the inner periphery thereof, a band means disposed within the channel for providing a good finished appearance to the top portion, handle means attached to said top portion and engaging said band means, second container means positioned within said top portion and extending substantially above said top portion, said second container means having a downwardly facing shoulder formed thereon which is adapted to rest on the upper surface of said inwardly directed channel means, said second container means having a plurality of spaced outwardly extending locking members formed on the lower portion thereof, said locking members being adapted to fit through said recesses, said locking members having sloping upper surfaces adapted to produce a cam action and clamp said second container in place on said top portion upon relative rotation of said second container means with respect to said first container means, said second container means having a recessed area formed at the lower portion thereof adjacent to said pouring spout portion to permit liquid to pass between said second container means and said top portion, the lower portion of said second container means being perforated to permit liquid flow therethrough, the upper portion of said second container means including a laterally directed handle portion to facilitate handling and manipulation of said second container means, said second container means having an opening at the top thereof, and cover means fitted within said opening.

6. Apparatus as defined in claim 5, wherein said main body portion of the first container means has a peripherally extending groove formed therein, said groove including a downwardly and inwardly sloping wall portion, resilient spring means fixed to the intermediate portion of said top portion and engaging the wall portion of said groove for urging the under surface of said channel against the upper edge of said main body portion, and a body of sealing material disposed between the under surface of said channel portion and the upper edge of said main body portion to provide a fluid-tight seal therebetween.

7. Apparatus as defined in claim 5, wherein one of said recesses and one of said locking members are of larger size than the other recesses and the other locking members to ensure that said second container means is locked in a predetermined relationship with respect to said first container means.

8. Beverage brewing apparatus comprising first container means including a main body portion and a top portion, said top portion including an inwardly directed channel portion facing in an outward direction and extending peripherally of the top portion, a plurality of recesses formed in the inner surface of said channel portion, second container means extending within the top portion of said first container means and including a downwardly facing shoulder adapted to rest upon the upper surface of said channel portion, said second container means having a plurality of locking members projecting outwardly from the lower portion thereof and adapted to fit through said recesses and engage the under surface of said channel portion, said locking members having sloping upper surfaces for creating a cam action to clamp the second container means in place relative to said first container means, said second container means having a perforated lower wall portion for permitting liquid flow therethrough, a tubular member extending through said lower wall portion, the upper end of said tubular member being open and being disposed a substantial distance above the lower wall, the lower end portion of said tubular member also being open and terminating at a point adjacent the bottom of said first container means.

9. Beverage brewing apparatus comprising a first container means having an open top portion including an inwardly directed rib means extending therearound, said rib means having a plurality of spaced recesses formed on the inner surface thereof, second container means disposed within said upper portion, said second container including a downwardly facing surface resting upon the upper surface of said rib means, said second container means having a plurality of locking members extending outwardly therefrom at a lower portion thereof, said locking members fitting through said recesses and locking said second container means in position on said top portion upon relative rotation of said second container means with respect to said first container means, said second container means having a first plurality of spaced lugs extending outwardly therefrom at a position below said locking members, and a third container means including a second plurality of inwardly extending lugs engaging said first plurality of inwardly extending lugs for locking said third container means on said second container means.

10. Apparatus as defined in claim 15, wherein said third container means includes an upper edge portion, said second container means having a downwardly facing shoulder formed thereon adapted to engage the upper edge portion of said third container means when in operative position, said third container means also including a perforated bottom wall portion.

11. Beverage brewing apparatus comprising first container means having an open top portion including an inwardly directed rib means extending peripherally therearound, said rib means having a plurality of spaced recesses formed in the inner surface thereof, second container means positioned within said open top portion and extending a substantial distance thereabove, said second container means including a plurality of spaced outwardly extending locking members at the lower portion thereof, said locking members being adapted to be received through said recesses and locking said second container means to said first container means upon relative rotation between said first and second container means, said second container means having a perforated bottom wall portion for permitting liquid flow therethrough, and flow control means overlying the perforations in said bottom wall portion, and means for moving said flow control means from a position closing said perforations to a position opening said perforations and vice versa.

12. Apparatus as defined in claim 11, wherein said flow control means comprises a disc-like member, and said means for actuating the flow control means comprises an arm extending upwardly from said disc-like member, the top portion of said second container means having a relieved area through which said arm projects outwardly of said top portion whereby the position of said disc-like member may be remotely adjusted.

13. Beverage brewing apparatus comprising first container means including a main body portion and a top portion, said top portion including an inwardly directed channel portion facing in an outward direction and extending peripherally of the top portion, a plurality of recesses formed in the inner surface of said channel portion, second container means extending within the top portion of said first container means and including a downwardly facing shoulder adapted to rest upon the upper surface of said channel portion, said second container means having a plurality of locking members projecting outwardly from the lower portion thereof and adapted to fit through said recesses and engage the under surface of said channel portion, said locking members having sloping upper surfaces for creating a cam action to clamp the second container means in place relative to said first container means, said second container means having a perforated lower wall portion for permitting liquid flow therethrough, a tubular member extending through said lower wall portion, the upper end of said tubular member being open and being disposed a substantial distance above the lower wall, the lower end portion of said tubular member also being open and terminating at a point adjacent the bottom of said first container means, said top portion of said first container means including a pouring spout portion, the lower portion of said second container means including a recessed area disposed adjacent said pouring spout portion when the second container means is in operative position to permit flow of liquid between said second container means and said top portion.

14. Beverage brewing apparatus comprising first container means having an open top portion including an inwardly directed rib means extending peripherally therearound, said rib means having a plurality of spaced recesses formed in the inner surface thereof, second container means positioned within said open top portion and extending a substantial distance thereabove, said second container means including a plurality of spaced outwardly extending locking members at the lower portion thereof, said locking members being adapted to be received through said recesses and locking said second container means to said first container means upon relative rotation between said first and second container means, said second container means having a perforated bottom wall portion for permitting liquid flow therethrough, and flow control means overlying the perforations in said bottom wall portion, and means for moving said flow control means from a position closing said perforations to a position opening said perforations and vise versa, said flow control means comprising a disc-like member, and said means for actuating the flow control means comprising an arm extending upwardly from said disc-like member, the top portion of said second container means having a relieved area through which said arm projects outwardly of said top portion whereby the position of said disc-like member may be remotely adjusted, said second container means having a sloping surface cam means formed on the top portion thereof for lifting said disc-like flow control member upon rotation of said arm member with respect to said second container means.

15. Beverage brewing apparatus comprising first container means having an open top portion including an inwardly directed rib means extending peripherally therearound, said rib means having a plurality of spaced recesses formed in the inner surface thereof, second container means positioned within said open top portion and extending a substantial distance thereabove, said second container means including a plurality of spaced outwardly extending locking members at the lower portion thereof, said locking members being adapted to be received through said recesses and locking said second container means to said first container means upon relative rotation between said first and second container means, said second container means having a perforated bottom wall portion for permitting liquid flow therethrough, and flow control means overlying the perforations in said bottom wall portion, and means for moving said flow control means from a position closing said perforations to a position opening said perforations and vice versa, the bottom wall of said second container means and said disc-like member having aligned openings formed therethrough, and a cylindrical member extending through said aligned openings thereby retaining said disc-like member in proper relative alignment with respect to said bottom wall and permitting relative rotation therebetween.

16. Beverage brewing apparatus comprising a first contaner means the upper end of which is open, said upper end including an inwardly directed channel portion extending therearound, said channel portion having spaced recessed portions formed on the inner periphery thereof, second container means including a bottom and having an open top portion, means for closing said open top portion, said bottom of the second container means being perforated for permitting liquid flow through the bottom of said second container means, a downwardly facing shoulder formed on said second container means and resting on the upper surface of said inwardly directed channel portion formed on said first container means, said second container means having formed on the lower outer surface thereof a plurality of outwardly extending spaced lugs each of which has a sloping upper surface thereon for producing a cam action upon relative rotation of said first and second container means, said lugs being received through said recessed portions of said channel portion on said first container means and being adapted to engage the undersurface of said channel portion.

17. Beverage brewing apparatus comprising a first container means having an open top portion, a second container means having an open top portion, means for closing the top of said second container means, said second container means including imperforate side wall portions and a bottom wall portion having opening means formed therein, one of said wall portions of said second container means resting directly on an upper portion of said first container means, said opening means formed in said second container means permitting liquid to move downwardly from said second container means into said first container means, control means in one of said container means when in closed position adjacent said bottom wall portion of said second container means for maintaining liquid in the upper container means for any period of time as desired by user, means connected with said control means and extending outwardly of one of said containers for manual movement to move said control means and allow liquid to flow through the opening means in the bottom wall portion of said second container means and into the lower container means, tubular means in the lower container means and opening thereinto for supplying heated liquid to the upper container means, said opening means in the bottom wall portion of said second container means being formed outwardly of and separate from said tubular means for providing a separate path of communication between said first and second container means for permitting liquid to continually move upwardly through said tubular means from said first container means to said second container means while liquid is simultaneously moving downwardly through said opening means from said second container means into said first container means.

References Cited in the file of this patent

UNITED STATES PATENTS

| | | |
|---|---|---|
| 492,074 | Walsh | Feb. 21, 1893 |
| 512,675 | Appleberg | Jan. 16, 1894 |
| 871,492 | Dunlap | Nov. 19, 1907 |
| 1,998,645 | Nessen | Apr. 23, 1935 |
| 2,105,201 | Richheimer | Jan. 11, 1938 |
| 2,151,407 | Lobl | Mar. 21, 1939 |
| 2,258,589 | Lehmann | Oct. 14, 1941 |
| 2,493,306 | Minerva | Jan. 3, 1950 |
| 3,103,872 | Kircher | Sept. 17, 1963 |

FOREIGN PATENTS

| | | |
|---|---|---|
| 24,144 | Great Britain | Dec. 4, 1899 |
| 59,608 | France | Feb. 3, 1954 |
| 919,345 | France | Nov. 25, 1946 |
| 1,142,137 | France | Mar. 25, 1957 |
| 1,157,094 | France | Dec. 23, 1957 |